C. C. SMITH.
SPEED INDICATOR FOR MOTOR CARS AND OTHER VEHICLES.
APPLICATION FILED APR. 2, 1910.
969,990.
Patented Sept. 13, 1910.
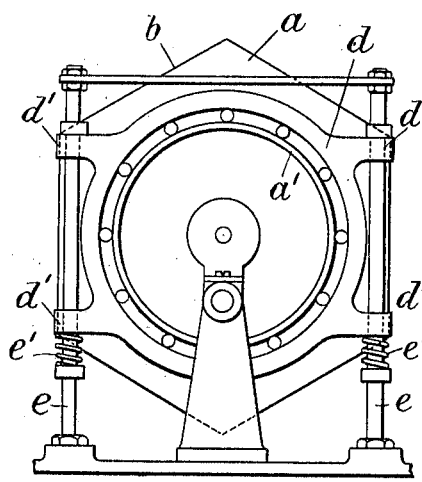
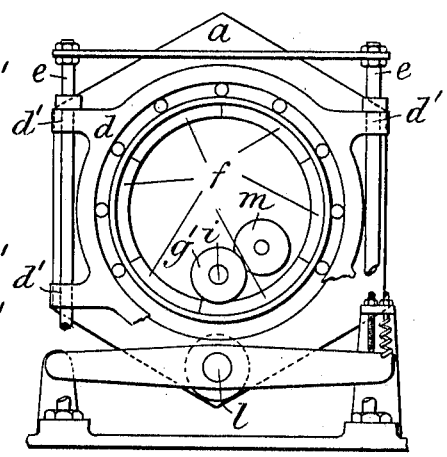
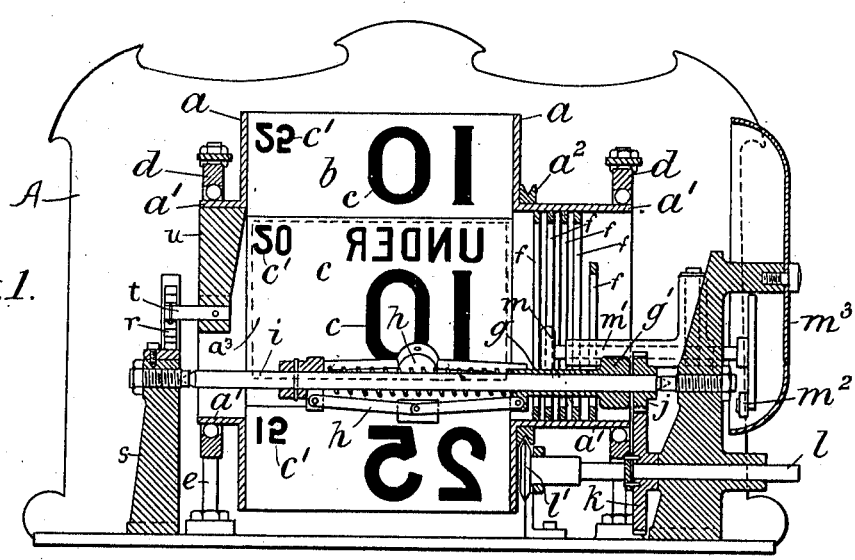
Witnesses
A. Cooper
C. K. Reichenbach
Inventor.
Cuthbert C. Smith
By E. B. Clark
Attorney

UNITED STATES PATENT OFFICE.

CUTHBERT COATES SMITH, OF TWICKENHAM, ENGLAND.

SPEED-INDICATOR FOR MOTOR-CARS AND OTHER VEHICLES.

969,990.  Specification of Letters Patent.  Patented Sept. 13, 1910.

Application filed April 2, 1910. Serial No. 552,999.

*To all whom it may concern:*

Be it known that I, CUTHBERT COATES SMITH, a subject of the King of Great Britain, residing at 14 Cornwall road, Twickenham, in the county of Middlesex, England, engineer, have invented certain new and useful Improvements in Speed-Indicators for Motor-Cars and other Vehicles, of which the following is a specification.

This invention relates to speed indicators for motor cars and other vehicles of the kind whereby a visual indication of the speed in miles per hour at which the vehicle is traveling is exhibited so as to be readily seen by pedestrians and others. In such devices as hitherto made the indicator is in the form of a fixed dial over which a hand or pointer travels to indicate the speed in miles per hour, but this construction requires a very large dial face, as otherwise the figures thereon cannot be seen by pedestrians when the vehicle is traveling at a high speed.

According to my invention the indicator is intermittently rotated or otherwise actuated so as to exhibit numerals representing the speed of the vehicle.

In the accompanying drawings Figure 1 is a sectional rear elevation of my improved speed indicator, and Figs. 2 and 3 are end elevations of the same partly broken away.

The same parts are lettered to correspond in all three figures of the drawings.

My improved speed indicator is made preferably in the form of a hexagonal prism $a$ the sides $b$ of which are made of transparent material, having the numerals and other information $c$ printed, painted or otherwise impressed thereon. The prism $a$ is provided with extended cylindrical ends $a'$ working on ball or other bearings in a frame $d$, having apertured ears $d'$ slidable on fixed rods $e$. Around the rods $e$ are spiral springs $e'$ on which the ears $d'$ rest.

Within one of the cylindrical ends $a'$ is mounted a series of cylindrical sectors $f$ which are frictionally engaged successively by a flange $g'$ on a sleeve $g$ connected to the movable end of a centrifugal governor $h$ on a shaft $i$ operated by suitable gear $j, k$ through shaft $l$ from one of the road wheels of the vehicle.

The cylindrical sectors $f$ are out of alinement, as shown in Fig. 1, and correspond in number with the sides or figures shown on the prism, and are so arranged as to be successively engaged by the sliding flange $g'$ connected to the governor.

To insure the rotation of the prism when the flange $g'$ engages any of the cylindrical sectors $f$ the meeting edges thereof are slightly beveled so that when the flange $g'$ engages a cylindrical sector $f$ it will cause the depression of the cylindrical ends $a'$ and the frame $d$ against the springs $e'$ on the rods $e$. On the outside of one of the cylindrical ends $a'$ is provided a grooved ring $a^2$ which by the downward movement of the cylindrical ends $a'$ is caused to engage with a driving wheel $l'$ fast on the shaft $l$. In the path of the flange $g'$ I may also provide a wheel $m$ adapted to be rotated by the said flange $g'$ when the vehicle has attained a predetermined rate of speed; this wheel $m$ is mounted on a shaft $m'$ carrying a hammer $m^2$ which hits the gong $m^3$ thereby giving an audible indication that the predetermined speed limit has been reached.

The prism $a$ is spring mounted through the medium of a coiled clock spring $r$, one end of which is secured to the supporting standard $s$, carrying the governor shaft $i$, and the other end of which is secured to a short arm $t$ fastened to a web $u$ which is secured to the inside projecting end $a'$ of the prism, as shown in Fig. 1. By means of this construction, the prism will be permitted when at rest to return to the zero position when the vehicle is not running. The interior of the prism may be provided with a lamp, or other means of illumination not here shown. It is mounted on the frame A of the vehicle adjacent to an aperture $a^3$ indicated by dotted lines, Fig. 1, through which the numeral on one of its faces or sides can be seen.

The device may be adapted to give a visual indication to the driver by small numerals $c'$ on extensions of the sides of the prism.

Having fully described my invention, what I claim and desire to secure by Letters Patent is:—

1. A speed indicator for motor cars and other vehicles, comprising a rotatably mounted body having numerals on its sides, a centrifugal governor device and means for operating it from the vehicle road wheel, a sleeve connected to the movable end of the governor and having a flange, cylindrical sectors arranged in parallel on the interior of the body and lying in the path of the flange on the governor sleeve and successively engageable thereby as the speed of the vehicle varies, whereby the indicator is intermittently rotated, substantially as described and for the purposes stated.

2. In a speed indicator for motor cars and other vehicles, the combination with a rotatably mounted indicating body and cylindrical sectors fixed parallel to each other on its inner surface, of a centrifugal governor device and a sleeve attached thereto mounted within the rotatable body, means for operating the governor from the vehicle road wheel, and the governor sleeve having a flange adapted to engage the parallel sectors successively and to rotate the body intermittently, substantially as described and for the purposes stated.

3. In a speed indicator for motor cars and other vehicles, the combination with a frame and a rotatable indicating body mounted therein, and having cylindrical sectors fixed parallel to each other on its inner surface, of a centrifugal governor device and a sleeve attached thereto mounted within the rotatable body, means for operating the governor from the vehicle road wheel, and the governor sleeve having a flange adapted to engage the parallel sectors successively and to rotate the body intermittently, substantially as described and for the purposes stated.

4. In a speed indicator for motor cars and other vehicles, the combination with a frame and a rotatable indicating body having cylindrical ends mounted in the frame, and cylindrical sectors fixed parallel to each other on and progressively around the inner surface of one of said cylindrical ends, of a centrifugal governor device and a sleeve attached thereto mounted within the rotatable body, driving mechanism for the governor, and the governor sleeve having a flange adapted to engage the parallel sectors successively and to rotate the body intermittently, substantially as described and for the purposes stated.

5. In a speed indicator for motor cars and other vehicles, the combination with a frame and a rotatable indicating body having cylindrical ends mounted in the frame, of cylindrical sectors fixed parallel to each other on, and progressively around, the inner surface of one of said cylindrical ends, a grooved ring secured to the outside of said end, a driving shaft having a wheel adapted to engage with said ring, a shaft within the rotatable body, a centrifugal governor device and a sleeve attached thereto mounted on said shaft, gearing connecting the same to the driving shaft, and the governor sleeve having a flange adapted to engage the parallel sectors successively and to rotate the body intermittently, substantially as described and for the purposes stated.

6. In a speed indicator for motor cars and other vehicles, the combination with a rotatably mounted body having sides and extensions thereon, each provided with indicating numerals, of cylindrical sectors on the interior of said rotatable body, a centrifugal governor mechanism having a sleeve and flange mounted within the body, and driving mechanism for the governor, said flange being adapted to engage the sectors successively and to rotate the body intermittently, substantially as described and for the purposes stated.

7. In a speed indicator for motor cars and other vehicles, the combination with a spring supported frame and a rotatable indicating body mounted therein, and having cylindrical sectors fixed parallel to each other on its inner surface, of a centrifugal governor device and a sleeve attached thereto mounted within the rotatable body, means for operating the governor from the vehicle roadwheel, and the governor sleeve having a flange adapted to engage the parallel sectors successively and to rotate the body intermittently, substantially as described.

In testimony whereof I have hereunto set my hand in presence of two subscribing witnesses this 21st day of March 1910.

CUTHBERT COATES SMITH.

Witnesses:
RIPLEY WILSON,
HUBERT D. JAMESON.